Oct. 6, 1925.
P. H. BURKHART
1,555,908
APPARATUS FOR MEASURING POWER FOR ELECTRICAL CIRCUITS
Filed Dec. 8, 1920
2 Sheets-Sheet 1
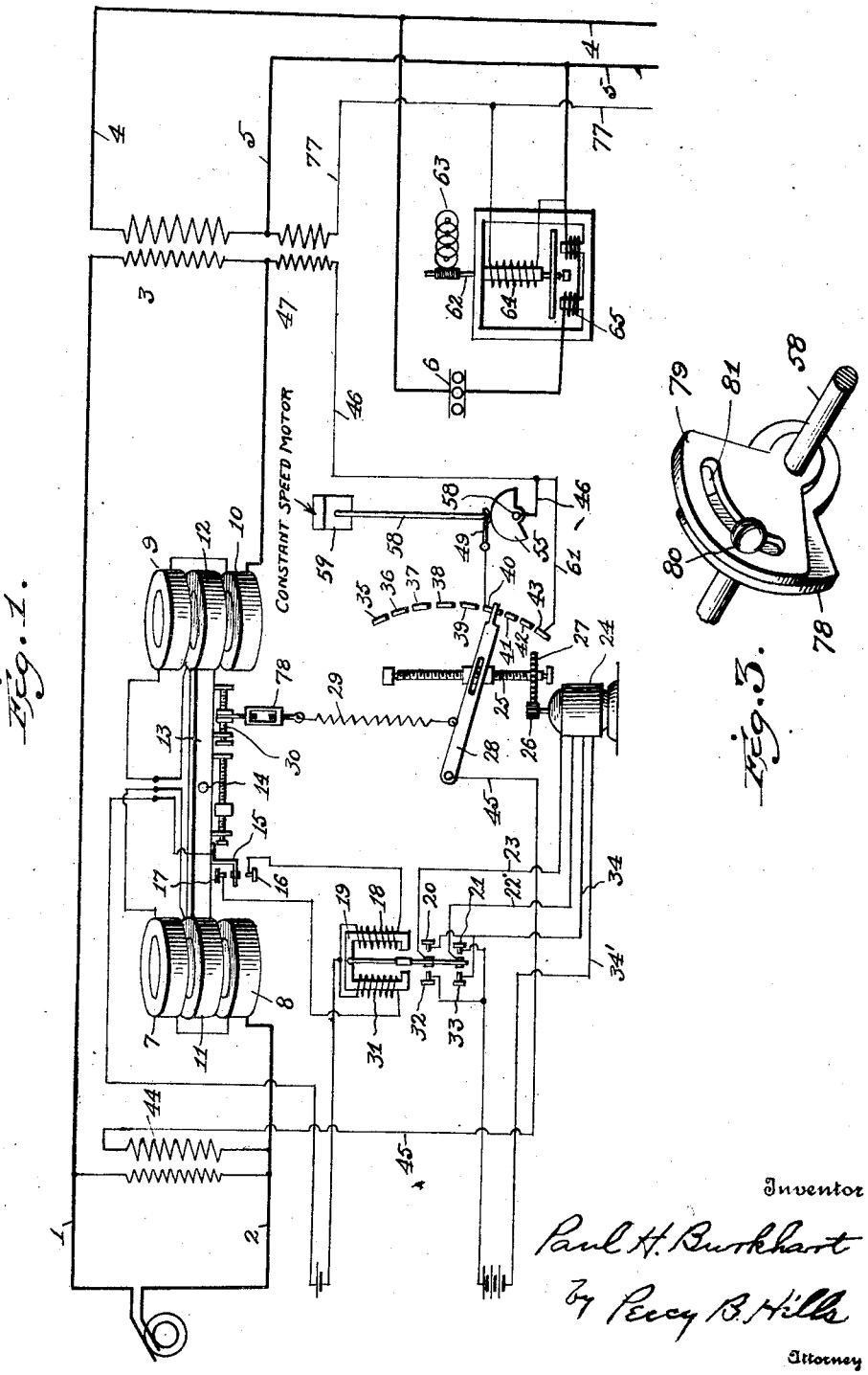
Inventor
Paul H. Burkhart
by Percy B. Hills
Attorney

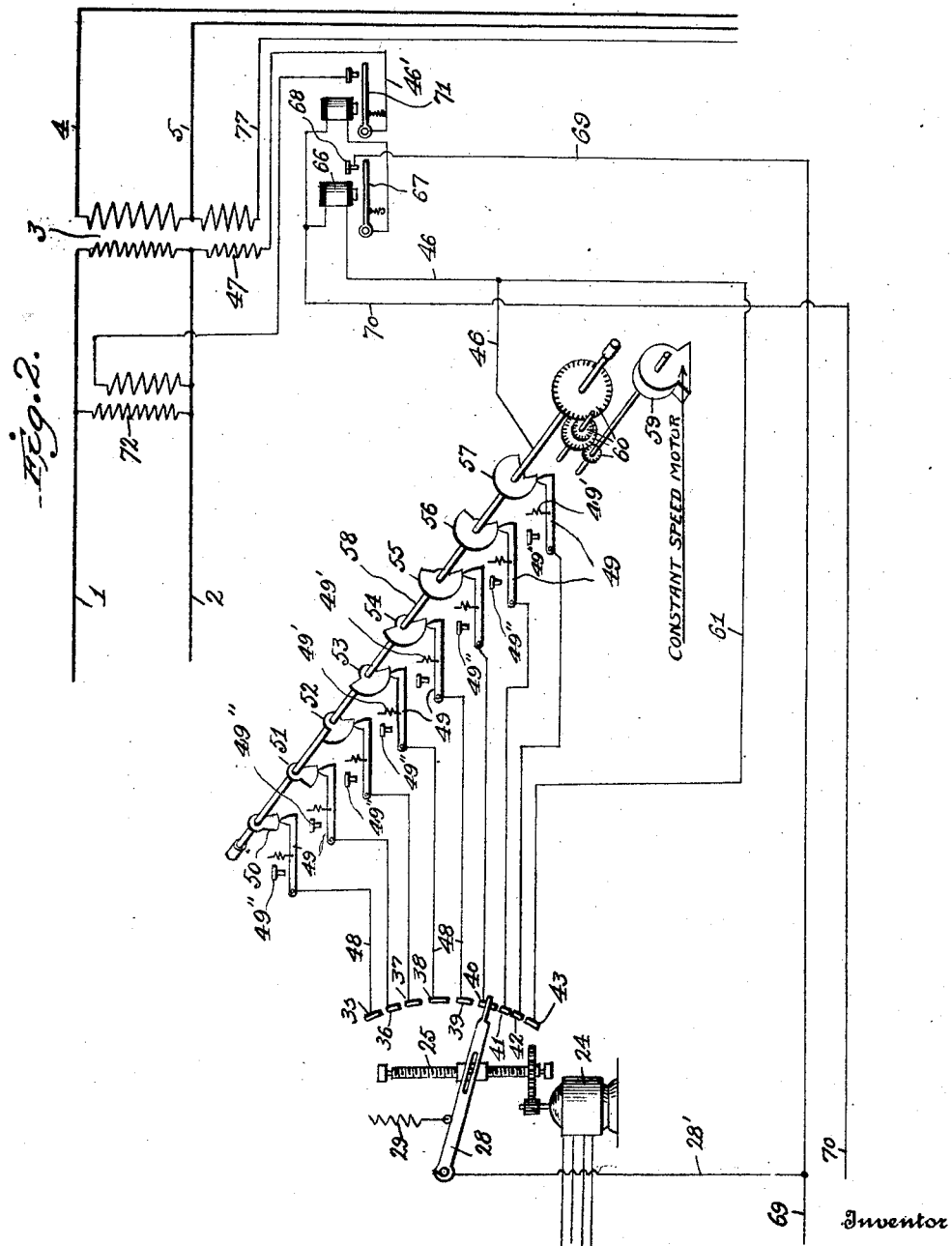

Patented Oct. 6, 1925.

1,555,908

UNITED STATES PATENT OFFICE.

PAUL H. BURKHART, OF HENRY, ILLINOIS.

APPARATUS FOR MEASURING POWER FOR ELECTRICAL CIRCUITS.

Application filed December 8, 1920. Serial No. 429,135.

*To all whom it may concern:*

Be it known that I, PAUL H. BURKHART, a citizen of the United States, residing at Henry, county of Marshall, State of Illinois, have invented certain new and useful Improvements in Apparatus for Measuring Power for Electrical Circuits, of which the following is a specification.

This invention relates to a method, system, and apparatus used for measuring at a variable rate the electrical energy consumed in electrical circuits, and has for its primary object to provide means for varying automatically the operation of the consumers' meters in an electrical distribution circuit in accordance with the amount of power being generated.

It has been the practice for some time to give the consumers whose load characteristics are definitely known favorable rates when they are using power at times when the total load on the generating station is small, which heretofore has been accomplished by using special meters to determine the demand on the consumers' circuits at any time, the rate being computed from the individual demand and generating station load data. In my improved system, the watthour meter in the consumer's branch circuit registers energy consumption intermittently, the intervals of registration and nonregistration being variable, and selected by apparatus controlled by the load on the generating station. The quantity registered by the meter in the consumer's branch circuit is substantially proportional to the summation of the instantaneous products of the energy consumed, multiplied by a variable factor which at all times depends upon the total load on the system.

More specifically my improved system contemplates the automatic control of operation of a meter by means of electrically operated switches controlled in their positions in accordance with the total load on the generating station, and my preferred form of meter control is by means of circuits periodically and variably interrupted to operate and stop variably said meter in accordance with said load.

My invention also embodies certain minor details of construction, as hereinafter more definitely will be pointed out and claimed, reference being had to the accompanying drawings, in which:—

Figure 1 is a diagrammatic view of one form of my improved system, the same being shown in connection with a single phase system.

Figure 2 is a similar view of my preferred form of mechanism for intermittently interrupting the operation of the consumers' meters, but showing a modified form of control for the auxiliary circuit.

Figure 3 is a detail view of one of the segmented circular disk contact elements showing a method of adjusting the active periphery of the disk.

Similar numerals of reference denote corresponding parts in the several views.

In said drawings referring more particularly to Figure 1, the reference numerals 1, 2, denote the lines transmitting electrical energy at high potential from a suitable generator, not shown, said energy being transmitted to a step-down potential transformer 3, where the line voltage is reduced, and from there is delivered through the lines 4, 5, to the point of consumption or load 6, the energy consumed there being measured by a suitable meter hereinafter to be described.

Inserted in the main transmission line 1, 2, is a current balance ammeter for measuring the total current of the system. If desired, a series transformer for protecting said current balance from high voltage may be inserted, but the same is omitted from the drawings for simplicity. Said current balance comprises six coils through which the current to be measured flows. Coils 7, 8, 9, 10, are stationary, while the coils 11, 12, are mounted on a frame 13, which is supported on a spindle 14 provided with suitable bearings, the circuit through all of said coils being completed by the conducting strips or wires connecting the same. When a current passes through these coils a magnetic field is established between the same, and a torque is produced, which tends to shift coils 11 and 12 in a counter-clockwise direction, which motion is restrained so that the current produces only a slight deflection. Attached to the under side of the frame 13 is a contact arm 15, adapted to engage contact 16 or contact 17 according to the direction of movement of said frame. When moved counter-clockwise, as above described, contact is made at 16, which completes an electrical circuit through the coil 18 of a motor reversing relay 19, thus closing contacts 20 and 21 and completing an electric circuit through wires 22, 23, 34 and 34' to a suitable motor 24, thereby causing the latter to rotate in one direction. The rotation of said motor 24 rotates a screw 25, the speed being reduced by suitable gears 26 and 27, and this rotation moves a switch arm 28 in a clockwise direction. A calibrated helical spring 29 is connected at one end to the underside of the frame 13, by a screw adjustment 30, and at its other end to the switch arm 28, and is subjected to a definite tension. When the pull exerted by said spring on the frame 13 equals the force tending to rotate said frame, the two forces will neutralize, and said frame will be restored to its initial position, thus opening contact at 16 and stopping rotation of the motor 24. The switch arm 28 is left in a position which corresponds to the force tending to rotate the frame 13, which in turn is proportional to the square of the current in the lines 1 and 2. For every value of current in said line there is a definite position for the switch arm 28 when the forces acting upon the frame 13 of the current balance are in equilibrium. When the current in the line 1, 2, decreases, the spring 29 will move the frame 13 clockwise through a small angle, and contact 17 will be closed, completing an electrical circuit through the other coil 31 of the motor reversing relay 19. Contacts 32 and 33 are thereby closed, thus completing an electrical circuit to the motor 24 through the lines 22, 23, 34, and 34', which will cause it to operate in a reverse direction, thus moving the switch arm 28 in a counter-clockwise direction. The tension on the spring 29 thus gradually is diminished, and when the forces acting on frame 13 again are in equilibrium, said contact 17 is opened the motor stops, and the switch arm 28 is left in a new position which corresponds to the current flowing through the main line 1, 2. Thus, whenever the value of the current in the line changes the switch arm 28 will assume a new position corresponding to the line current.

The switch arm 28 is adapted always to establish electrical contact with at least one of a series of contact plates 35 to 43, contact being shown in Figure 1 as made with plate 40. A second electrical circuit is connected through the switch arm 28, branches of this circuit being connected to the contact plates 35 to 43, and voltage from a suitable source is impressed upon the circuit. In the drawing the primary of a transformer 44 is connected across the line 1, 2, the secondary supplying energy to this second circuit, one lead 45 from said transformer being connected electrically to the switch arm 28 as shown. Electrical connection is thus established from transformer 44 through arm 28, contact plate 40, a contact making and breaking device hereinafter described, lead wire 46, and an auxiliary transformer 47 to the customer's branch of the distribution circuit, all in a manner hereinafter described.

Referring now to Figure 2, the detail of the contacts for opening and closing the second circuit variably and in accordance with the current measured by the current balance first will be described. Leading from each of the contact plates 35 to 43 is one of a series of wires 48, each connected with a separate contact finger 49 adapted to make contact with one of a series of rotating segmented circular disks 50 to 57, mounted upon a common rotatable shaft 58, said shaft being rotated continuously at constant speed by a clockwork or other motor 59, the reducing gearing 60 for rotating the shaft 58 at a suitable speed being chosen for example so as to rotate said shaft at an angular speed of one rotation a minute. Each of said fingers 49 is drawn normally towards its disk by a suitable spring 49', and its movement in that direction is limited by a stop 49''. It will be observed that the segmented disks increase gradually in angular size from disk 50 to disk 57, so that the contact of the fingers 49 therewith varies in proportion to the angular size of said disks. The arm 28 is shown in contact with plate 40, which completes the electrical circuit through disk 55 which is of such a size that contact is made for example for six tenths of the time of rotation of the shaft 58. Said shaft being rotated for example at an angular speed of one revolution per minute, the contact at 55 is made for 36 seconds of each minute and said contact is broken for the other 24 seconds of that minute. The speed of rotation of the shaft 58 arbitrarily is chosen so that the period of registration and rest of the consumers' meters will be small, so that changes in the consumers' loads will not affect the precision of the measured quantities. When the load on the entire system is at maximum, the switch arm 28 will be held in contact with plate 43, which is connected through lead wire 61 to wire 46, and the auxiliary circuit delivers current to the consumers' meters without interruption so that energy consumption is registered continuously. When the load on the system is less than the peak load then the arm 28 connects the auxiliary or second circuit through the proper segmented circular disk contact, and a lower rate is offered to the consumers, some one of the disks 50 to 57 interrupting the circuit through wire 46, thus making and breaking the auxiliary circuit through the transformer 47.

The customer's meter shown in Figure 1, is an induction type integrating watthourmeter, which is essentially a split phase induction motor comprising a rotatable member 62, connected to a registering mechanism 63 through a train of gears, and rotated by the resultant magnetic flux established by the currents flowing in the two coils 64 and 65, the coil 64 being connected across the auxiliary circuit and normally having either a voltage proportional to the load voltage or zero voltage impressed across it, while the coil 65 is connected in series with the line, and carries a current either equal to or proportional to the current flowing to the load 6. When current flows through both coils a rotating magnetic field is established, which causes the member 62 of the meter to be rotated.

In a distribution circuit having a great many metered loads the energy supplied to the potential coils of all the consumers' meters is considerable, which, with the system shown in Figure 1, would require that the rotating segmented disks and their contact making fingers must be comparatively large, so that they could break the circuit under such conditions. In order to avoid this I have provided a modified construction, shown in Figure 2, for controlling the make and break of the auxiliary circuit as follows: The wire 46 leading from the shaft 58 carrying current through one of the disks 50 to 57, as well as the wire 61 leading from the contact 43, are connected in the circuit with a relay 66, which, when energized, by means of its armature 67 closes a control circuit at contact 68, said circuit being supplied by wires 69 and 70, from any suitable source of power, such as a generator or a storage battery, with the former of which the switch arm 28 may be connected by lead 28', and through switch 71, closes a circuit through the auxiliary transformer 47, the current for this circuit being derived from the transformer 72 in the main line 1, 2, or from some other suitable source. By this arrangement the control current through the wires 69, 70, may be of any desired strength, and the size of the disks 50 to 57 and their cooperating parts governed accordingly.

The operation of my system of measuring power will be understood as follows: When no current is flowing through the main line 1, 2, the frame 13 will be drawn by the tension of spring 29 clockwise, thereby closing contact at 17, energizing magnet 31, closing contacts at 32 and 33 and causing a current to pass through the lines 22, 23, 34 and 34', to the motor 24, which will rotate the screw 25 so as to move the switch arm 28 counter-clockwise until the switch arm comes in contact with contact 35, in which position the spring 29, which may be properly adjusted by the turnbuckle 78, will cease to be under tension, whereupon the frame 13 will resume its intermediate position breaking contact at 17 and stopping the motor 24. Now when an electrical load is put on the system the current passing through the current balance immediately will cause the frame to move counter-clockwise, closing the circuit at 16, energizing magnet 18, closing the contacts at 20 and 21, 22, and completing the electrical circuit through the wires 23, 34, and 34' to the motor 24, causing the latter to rotate the screw 25 and move the switch arm 28 clockwise or downward, so that it will engage successively with contacts 35, 36, etc., this movement of the motor and the switch arm continuing until the tension of the spring 29 equals the torque of the current balance, whereupon the frame 13 will assume its intermediate position, breaking contact at 16 and stopping the motor 24. If the generator is supplying a maximum load to the system the switch arm 28 will move until it engages with contact 43, in which position there is a constant flow of current through the line 61, and a consequent continuous registration of energy consumption in the consumers' branches of the distribution circuit. But if the generator supplies a load to the distribution circuit which is less than the maximum, the position of the switch arm 28 will be shifted correspondingly to a position, say in engagement with contact 40, as shown in the drawings, which will cause the auxiliary circuit to be connected through the segmented disk 55 and thus to be broken for 24 seconds of each minute, as hereinbefore described, similarly stopping the registration of energy consumption in the consumers' branches of the circuit for that amount of time during each minute. By means of this system, the operation of the power registering mechanism in the consumers' branches of the distribution circuit will be governed automatically by the magnitude of the current flowing through the main lines 1, 2, so that under full load said register will operate continuously, but will register energy consumption intermittently and in accordance with the measured load when the load is less than the maximum. Thus, when the load on the entire system changes, the switch arm 28 assumes a new position, and completes the auxiliary circuit through a different contact plate, and a differently proportioned segmented disk interrupts the auxiliary circuit, thus offering a new rate to the consumers.

While I have shown and described my improved system as applied to single phase power distribution circuits, where energy is transmitted at high voltage and delivered to the consumers' circuits at low potential, it will be understood that this method of measuring energy consumption is not limited to single phase systems of power distribution, as it is equally well adapted to be used in connection with two phase, three phase or any polyphase systems of power distribution, the number of current balances employed being in accordance with the number of phases. Thus, in a three phase system, three current balances are used, one in each of the three power lines, each of said current balances being practically identical with that of the single phase system described. In a two phase four wire system, only two current balances are required; in a two phase five wire system four current balances are required; in a six wire six phase system six current balances are required.

In my proposed system of supplying intermittently the current delivered to the potential coils of the consumers' meters, it is possible to obtain the current for the auxiliary circuit from the distribution wires at a point near the place where energy is consumed. The relay or switch with its contact element 71 can be located near the point of energy consumption, and the auxiliary circuit leading to any number of consumers' meters can be opened and closed by the action of this switch. The switch 71 can be controlled from some other point in the distribution system by the relay 66 so that it will operate in accordance with the measured load which controls the operation of the current balance.

The control circuits for the relays 18 and 31 and the motor 24 as well as the control circuit for the relay 66 are all shown separate because they operate independently. However the power supplied to these control circuits may be derived from one source, though not necessarily. Power may be taken from the lines of the distribution circuit to feed these control circuits, but generally in power stations direct current control circuits could be used with advantage. Any source of power can be used on any of these control circuits, but direct current is ordinarily preferable.

While I have shown and described one form of mechanism for making and breaking the auxiliary circuit to the meters for operating variably and stopping said meters, still I do not wish to limit myself to such construction as the same may be varied in several ways.

In Figure 3 I have shown a modified construction of the disks 50 to 57, showing means for varying the active periphery of the same. Thus, each of said structures comprises two segmented disks 78 and 79, the disk 78 being fixed to the shaft 58, while disk 79 is mounted rotatably thereon. A set-screw 80 engaging disk 78 and passing through a slot 81 in disk 79 affords a ready means for locking the disk 79 in any adjusted position with respect to disk 79, in a manner readily understood. This construction permits adjustments to be made in the timing of the making and breaking of the auxiliary circuit, and consequent changes in the rate offered to the consumers for any value of load on the main circuit.

Having thus fully described my invention, what I claim as new and desire to secure by Letters Patent, is:—

1. A system for variably measuring the energy consumed in electrical circuits, comprising a power circuit, an energy measuring and registering device in each consumer's branch of the power circuit, a current balance connected in the power circuit, an auxiliary circuit derived from said power circuit, a switch in said auxiliary circuit for controlling the operation of the energy measuring and registering devices, a plurality of contacts for said switch, a calibrated spring connecting said switch with the movable element of said current balance, and a motor controlled by said movable element for shifting said switch, said spring operating through the shift of said switch to bring said movable element to neutral or equilibrium, thereby stopping said motor.

2. A system for variably measuring the electrical energy consumed in a branch of an electrical circuit, comprising a power circuit, a source of electrical energy for the power circuit, a branch load circuit supplied thereby, an integrating watthourmeter in the branch circuit, a current balance in the power circuit, an auxiliary circuit, a source of electrical energy for the auxiliary circuit, a switch in the auxiliary circuit comprising a switch arm, a plurality of contacts, contact fingers, and rotating switch elements for making and breaking the auxiliary circuit, a spring connecting the switch arm with the movable element of the current balance, a motor controlled by said movable element for shifting said switch arm, said spring operating through the shifting of said switch arm to bring said movable element to a neutral position, thereby stopping said motor, and means whereby the operation of the switch in the auxiliary circuit controls the registration of energy consumption in the branch circuit.

3. A system for variably measuring the energy consumed in an electrical circuit, comprising a power circuit, a current balance in said circuit, an auxiliary circuit derived from said power circuit, a switch in said auxiliary circuit, a power measuring and registering device controlled by the auxiliary circuit in each consumer's branch of the power circuit, a plurality of contacts for said switch in the auxiliary circuit, a calibrated spring connecting said switch with the movable element of said current balance, a motor for shifting said switch, and a control circuit controlled by the movable element of said current balance for controlling the direction of rotation of said motor or for stopping the same, said spring operating through the shift of said switch to bring said movable element to neutral or equilibrium thereby stopping said motor, a turnbuckle for adjusting the tension of the calibrated spring, a screw adjustment for changing the point of connection of the spring to the movable element, and an adjustable counter-balance for balancing the movable element.

4. A system for variably measuring the energy consumed in an electrical circuit, comprising a source of electrical energy, a main distribution circuit, a branch load circuit supplied thereby, an integrating watthourmeter in the branch circuit, an auxiliary circuit, a source of electrical energy for the auxiliary circuit, a current balance in the main distribution circuit, a switch arm in the auxiliary circuit, means for causing this switch arm to assume a definite position for every value of current measured by the current balance ammeter, a plurality of contacts arranged so that the switch arm is always in electrical contact with at least one of them, electrical conductors connecting the auxiliary circuit to each of the contacts through contact fingers, a series of segmented circular disks, means for rotating the disks continuously at a suitable uniform speed, springs for holding the contact fingers in contact with the segmented disks, stops to restrict the motion of the contact fingers so that contact beween the contact fingers and their respective disks is broken for certain positions of the disks, and means whereby the registration of energy consumption in the branch circuit is controlled by the operation of the switch mechanism in the auxiliary circuit.

5. A system for variably measuring the energy consumed in a branch of an electrical circuit, comprising a power circuit, a source of electrical energy for the power circuit, a branch load circuit supplied thereby, an auxiliary circuit, a source of electrical energy for the auxiliary circuit, an integrating watthourmeter in the branch circuit, a current balance ammeter in the main power circuit, a switch arm in the auxiliary circuit, means for causing this switch arm to assume a definite position for every value of current measured by the current balance, a plurality of contacts arranged so that the switch arm is always in electrical contact with at least one of them, electrical conductors connecting the auxiliary circuit to each of the contacts through contact fingers, a series of rotatable segmented circular disks, each disk being electrically in contact with its respective contact finger during a part of the time of each rotation, said disks being electrically a part of the auxiliary circuit, means for limiting the active periphery of each disk to a predetermined size, means for rotating the disks continuously, means for holding the contact fingers in contact with their respective disks for a part of each rotation, means whereby the circuit between the disks and contact fingers is broken for certain positions of the disks, the angular size of the segmented disks being different so that the ratio of the time during which the auxiliary circuit is open or closed to the time necessary for the disks to make one complete rotation is a variable depending upon the position of the switch arm and the load on the main power circuit, provision being made that for one position of the switch arm the auxiliary circuit may not be interrupted, and means whereby the making and breaking of the auxiliary circuit controls the registration of energy consumption in the branch of the power circuit.

6. A system for variably measuring the energy consumed in a branch of an electrical circuit, comprising a power circuit, a source of electrical energy, a branch load circuit supplied thereby, an integrating watthourmeter in the branch circuit, an auxiliary circuit, a source of electrical energy for the auxiliary circuit, a switch mechanism in the auxiliary circuit, means whereby the switch mechanism in the auxiliary circuit is controlled by the electrical load on the main power circuit, a second auxiliary circuit, a source of electrical energy for the second auxiliary circuit, a relay in the first auxiliary circuit for controlling the flow of current in the second auxiliary circuit, and means whereby the registration of energy consumption by the watthourmeter in the branch of the power circuit is controlled directly by the flow of current in the second auxiliary circuit and indirectly by the flow of current in the first auxiliary circuit.

In testimony whereof, I hereunto affix my signature.

PAUL H. BURKHART.